United States Patent [19]
Blomdell et al.

[11] Patent Number: 6,027,167
[45] Date of Patent: Feb. 22, 2000

[54] METHOD TO SAFELY RESTRAIN OCCUPANTS IN A CRASHING VEHICLE AND A SEAT CONSTRUCTED TO PERFORM SAID METHOD

[76] Inventors: Peter Blomdell, S-41267; Rolf Agerberth, S-41266, both of Göteborg, Sweden

[21] Appl. No.: 09/125,541

[22] PCT Filed: Feb. 28, 1997

[86] PCT No.: PCT/SE97/00354

§ 371 Date: Aug. 28, 1998

§ 102(e) Date: Aug. 28, 1998

[87] PCT Pub. No.: WO97/31800

PCT Pub. Date: Sep. 4, 1997

[30] Foreign Application Priority Data

Feb. 29, 1996 [SE] Sweden ................................. 9600817
May 24, 1996 [SE] Sweden ................................. 9602029

[51] Int. Cl.$^7$ ................................................. B60N 2/42
[52] U.S. Cl. .................................. 297/216.1; 297/452.19
[58] Field of Search .......................... 297/216.1, 216.13, 297/216.14, 452.18, 452.19, 452.2

[56] References Cited

U.S. PATENT DOCUMENTS

| | | | |
|---|---|---|---|
| 3,131,971 | 5/1964 | Gunn | 297/449 X |
| 4,993,778 | 2/1991 | Colin et al. | 297/452.2 |
| 5,568,961 | 10/1996 | Colasanti | 297/362.12 X |
| 5,645,316 | 7/1997 | Aufrere et al. | 297/216.13 X |
| 5,749,135 | 5/1998 | Crane et al. | 29/415 X |
| 5,769,499 | 6/1998 | Dudash et al. | 297/452.18 |
| 5,791,738 | 8/1998 | Niezoldt | 297/452.18 X |

FOREIGN PATENT DOCUMENTS

| | | |
|---|---|---|
| 590237 | 4/1994 | European Pat. Off. . |
| 2104776 | 3/1983 | United Kingdom . |
| 90/14245 | 11/1990 | WIPO . |

Primary Examiner—Lynne Browne
Assistant Examiner—Brian H. Buck
Attorney, Agent, or Firm—Young & Thompson

[57] ABSTRACT

A method for safe restraint of occupants in a crashing vehicle using safety belts, and a double tube frame construction vehicle seat. In a crash the kinetic energy of the occupant is restrained by the belt and by the cooperating resiliently deformable double tube frame construction in such a way that, at a moderate load, the upper portion of this double tube frame construction will move resiliently, but with a bigger load a permanent deformation will be the result. The device includes a seat frame with a seat portion and a back rest portion being made of a parallel tube frame having two tubes arranged above/under and forward/behind, at the seat portion and at the back rest portion respectively, up to a height at the breast of the occupant. The tubes are twisted above this height to a position side by side. Reinforcing, deformable form plates are rigidly arranged between the parallel tubes at least at the seat portion and at the lower portion of the back rest portion.

10 Claims, 4 Drawing Sheets

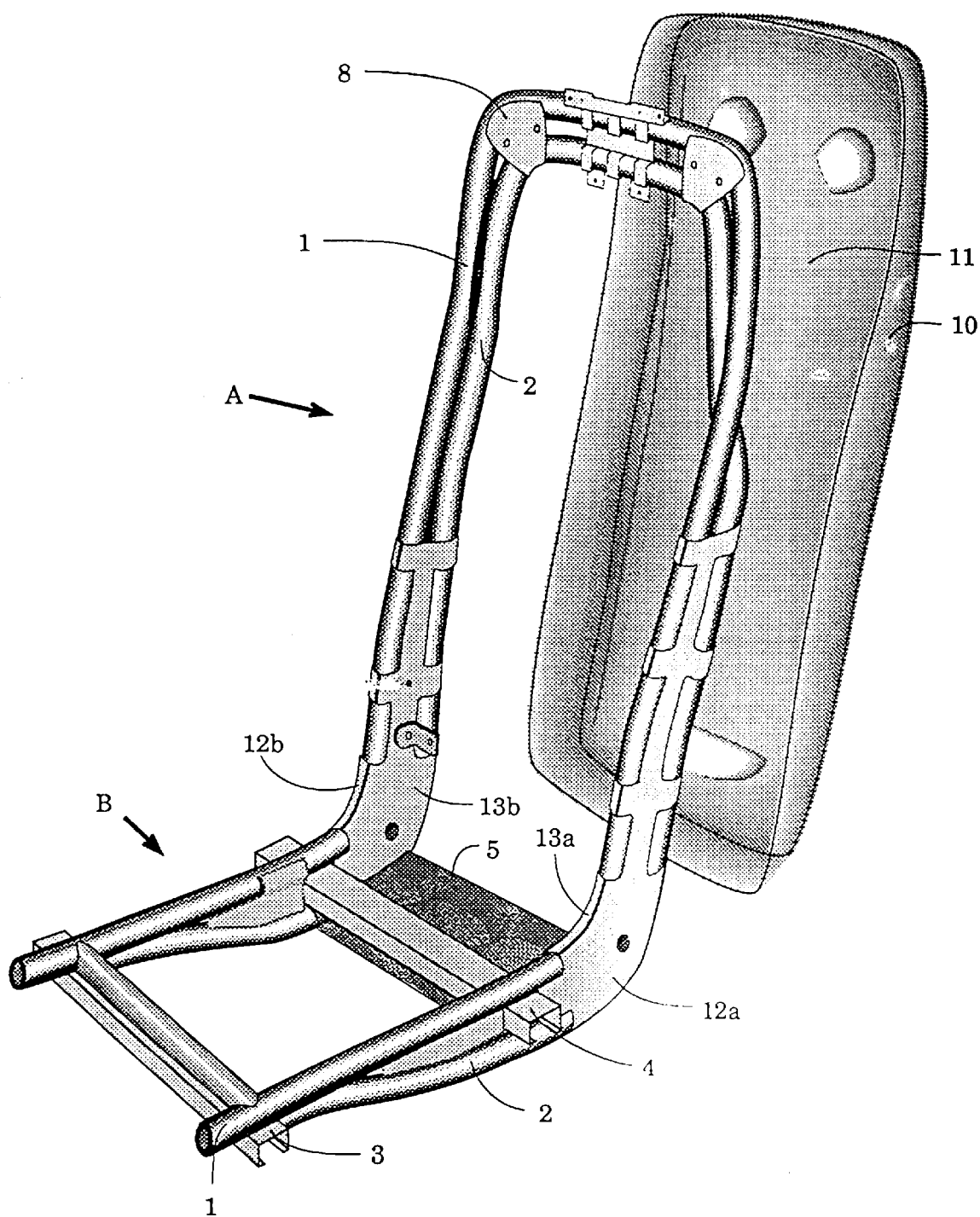

METHOD TO SAFELY RESTRAIN OCCUPANTS IN A CRASHING VEHICLE AND A SEAT CONSTRUCTED TO PERFORM SAID METHOD

BACKGROUND OF THE INVENTION

The present invention relates to a method for safely restraining occupants in a crashing vehicle, and a seat constructed to perform this method. More particularly, the invention relates to a technique to obtain a safe and gentle restraint of passengers/driver by using a safety belt that is integral with the seat.

The advantages of being restrained by a safety belt to avoid injuries in a crashing car are well known. However, there are problems as to how to attach the safety belts in a limited space, for example in buses and in other modes of public transportation.

The use of safety belts in public transportation involves problems regarding a safe attachment of the safety belts in the vehicle or to a seat. An attachment in the seat of the type used today must involve a rigid and voluminous construction which will occupy some of the useful space in the vehicle. An attachment outside the seat must have rigid points of attachment also occupying some of the useful space in the vehicle and requiring a great strength of the vehicle's walls and floor. Further, the attachment of the safety belts in the vehicle should not increase the risk of injuries to other passengers.

DE-A-2 546 157 discloses a back rest of a vehicle seat with a built-in safety belt, the back rest being resiliently collapsible while being in its transverse direction. This construction cannot absorb any greater loads and is seemed to be very dangerous at crashes over 30 km/h. Thus, at greater loads the resiliency being obtained comes suddenly to an end and the created shock is believed to be fatal for an occupant using the belt.

U.S. Pat. No. 4,993,778 discloses a seat construction with an integral safety belt. The attachment of the belt is secured outside the seat. This construction is not made to accumulate the loads in a crash.

WO 9014245 is one example of a seat construction being extremely solid. In a crash with this construction there is nothing making a gentle, progressive restraint of the occupant possible. This document is one example of a voluminous and heavy construction without refinements. The same can be said about EP-0 590 237 in which an effort has been made to get a slim construction. However the construction is very complex and probably rather heavy.

SUMMARY OF THE INVENTION

The object of the present invention is to provide a safety belt that is integral with a seat in a vehicle, wherein a light and not voluminous seat body is capable of accumulating great loads in a crash by a beneficial distribution of the actual load from the belt by a resilient and perhaps permanent deformation initially at the back rest of the seat and later at the lower seat portion. In the load from a crash there is also a 5 to 10% extension of the belt, and this extension can, together with the deformation of the back rest of the seat, contribute to a gentle restraint of the occupant. Surprisingly the deformations decrease the injuries from a whiplash effect on the occupants.

In a crash the kinetic energy of the occupants is restrained by the safety belts and by a cooperating resiliently deformable double tube frame construction in such a way that during a modest load the upper portion of the double tube frame construction will move resiliently, but at a greater impact or load a permanent deformation of the double tube frame construction will occur at the same time as the resilient deformability contributes to bringing the occupant back towards the back rest of the seat by a resilient back transfer of an upper portion of the double tube frame construction. Surprisingly, it has been shown that the loads on the neck portion of the occupant, and whiplash injuries, will be decreased compared to the same restraint of an occupant in a conventional safety belt in a seat having the belt attached outside of the seat. To some extent this beneficial effect can be explained by the braking effect on the occupant being dynamic in such a way that at first the belt is stretched during a simultaneous progressive dampening by the resiliency in the upper portion of the tube frame at the back rest. When this happens the permanent deformation will occur, but not at that part of the double tube frame construction where the resilient deformability takes place. Thus this resiliency is still there and can meet the occupant at a backwards jerk to slow down the speed of the head.

At higher speeds there will be a phase where a deformation occurs in the bent portion of the parallel tube construction (at the passage from the back rest to the seat). At the same time, or a little later depending on the type of the vehicle, it is possible to start an energy accumulating deformation of the brackets on the floor usually used to attach the seat construction to the floor of the vehicle. By a suitable dimensioning and choice of material a very gentle slowing down of the occupants can occur during a maximal resilient and permanent deformation of all the deformation zones.

Thus, according to the present invention it is possible to manufacture seats being specially adapted to children and school buses in such a way that some of the seats are made for children with a weight up to e.g. 20 kg; other seats for children up to e.g. 20–30 kg; etc. In this manner the safety for all the occupants can be increased. It is of course possible to use a technique according to the invention in family cars, too. Thus the dimensioning and form of the seat is not made only with regard to the weight of the body, but also to the length, the corpulence, and to the length ratio between body/legs.

Accordingly, the present invention is a device that gently restrains the occupants/driver by a safety belt being attached to the seat of the vehicle. This device is characterized in that it includes, a seat frame with a seat portion and a back rest portion (B;A) being made of a parallel tube arrangement where two tubes (1, 2) are arranged above/under and forward/behind each other at the seat portion (B) and at the back rest portion (A) respectively up to a position of the breast (D) of an occupant, above this position the tubes being twisted to a position side by side, and reinforcing, deformable form plates (12) rigidly arranged between the parallel tubes (1, 2), at least at the seat portion (B) and at the lower portion of the back rest (A).

This construction saves valuable space, preferably in public transport vehicles having several rows of seats in front of each other, and at the same time can keep the weight rather low.

BRIEF DESCRIPTION OF THE DRAWINGS

The invention will now be described in connection to embodiments shown in the drawings, where;

FIG. 3 is an oblique front pictorial view from above the seat body with reinforcing plates and with a covering back;

DESCRIPTION OF THE PREFERRED EMBODIMENT

Figure 2:
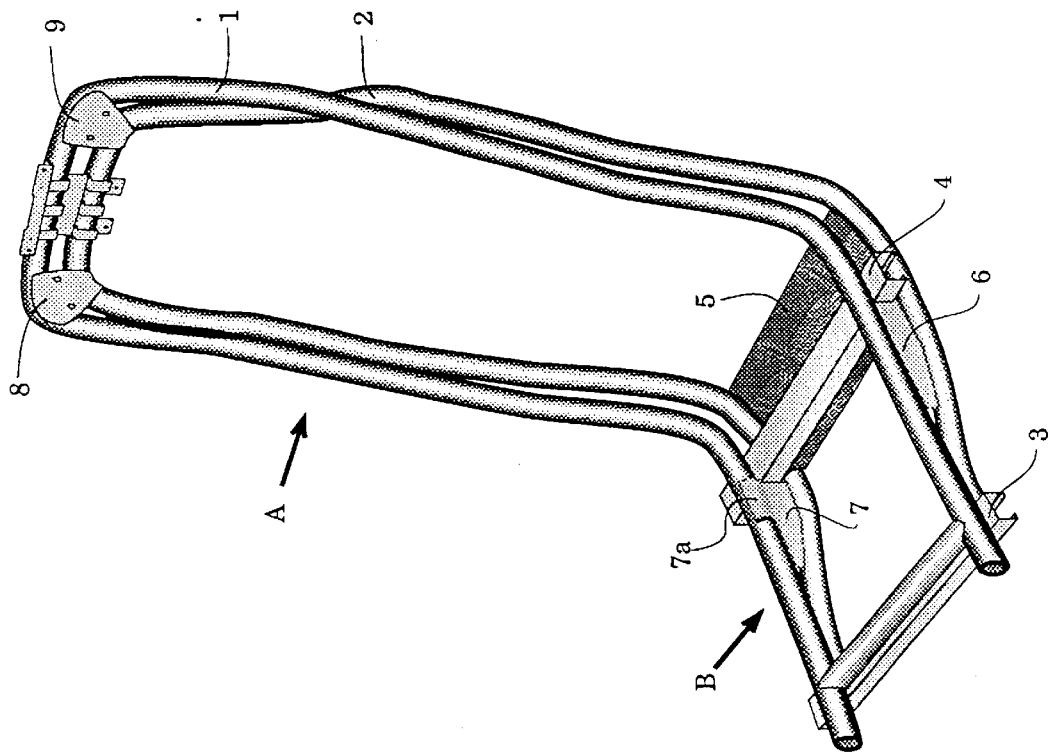
FIG. 2 is an oblique front pictorial view from above the seat body according to FIG. 1.
Figure 1:
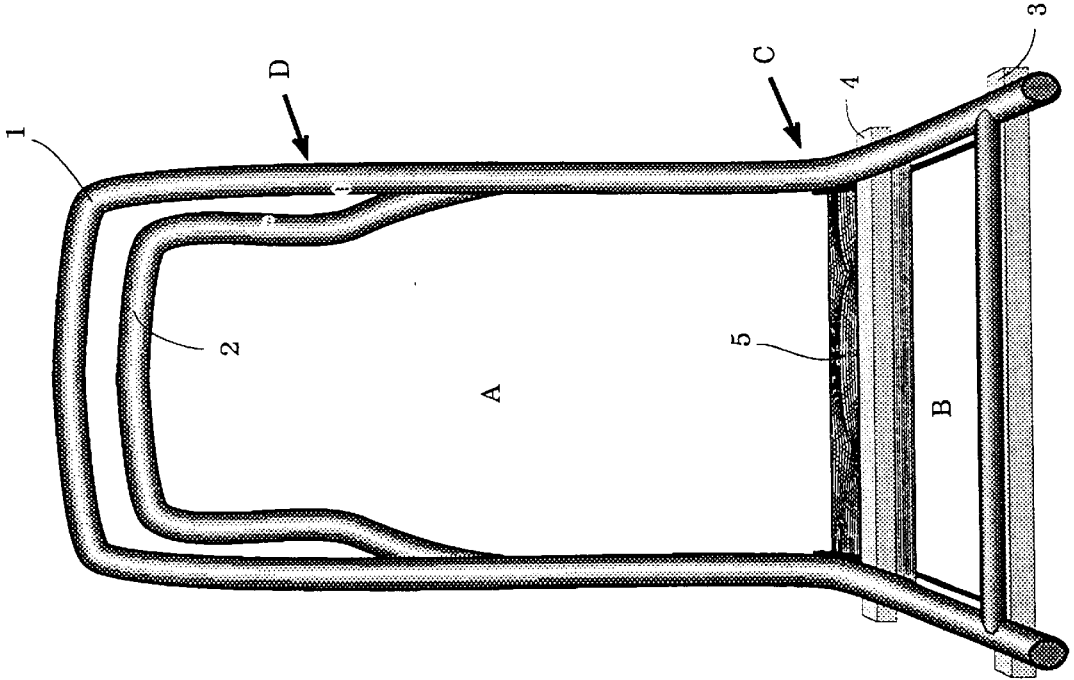
FIG. 1 is an oblique front pictorial view of a seat body principally comprising a parallel tube frame arrangement according to the invention.

FIG. 1 discloses an oblique front pictorial view of a seat body principally comprising two parallel tube frame portions 1 and 2. The portions 1 and 2 are parallel from the lower seat member B to the back member A via a bent portion C. U-girders 3 and 4 are used for attaching the seat to a bracket portion (not shown) locked to the floor of the vehicle. A stabilizing plate 5 at the seat is attached to the tube frame portion 2. Approximately at the breast height, the position D in FIG. 1, the tube frame portions 1 and 2 are transferred from a position where the tube frame portions are front to back to a side-by-side position. Two fastening means 8 and 9 connect the tube frame portions at the uppermost part of the seat body. FIG. 2 shows how the tube frame portions 1 and 2 are separated from each other at the bent portion C. (The portion of the seat above D where the tubes are side-by-side defines an upper back portion of the seat, and the portion of the seat below D and above C where the two tubes are front-to-back defines a lower back portion of the seat.)

A reinforcing plate 7 is arranged at the lower seat portion and will stiffen the seat body and increase its resistance to breaking. This is also the reason for using tubes with an oval cross section in the body. At the plates 6 and 7 there are also bent portions 6a (not visible) and 7a. These bent portions will connect to the oval cross section of the tube and will, together with an adjacent tube portion, form an arrangement for attaching a seat member.

Figure 5B:
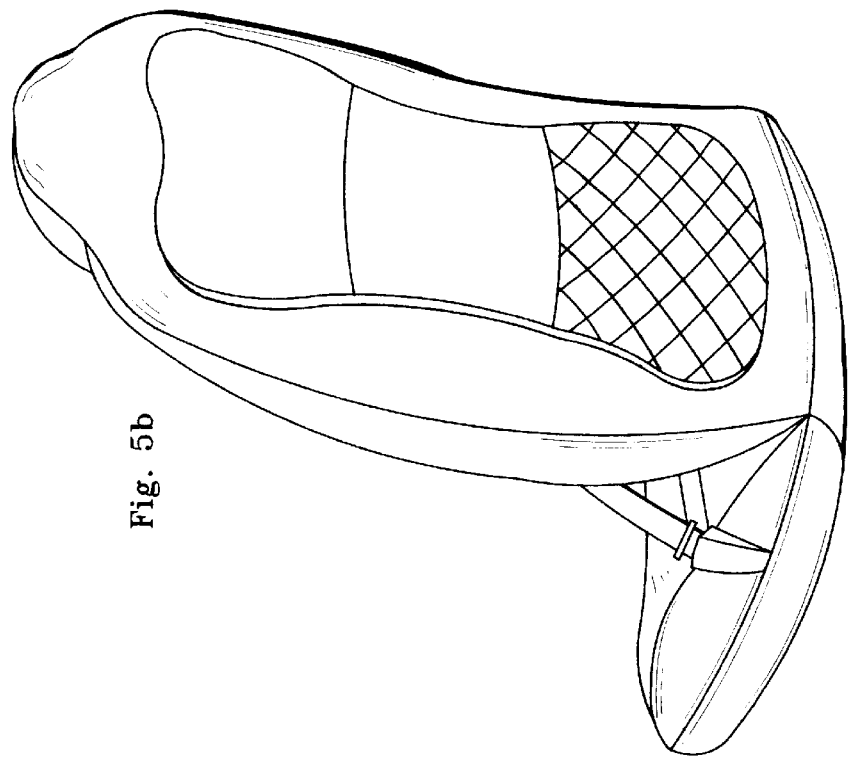
FIGS. 5a and 5b are an oblique front pictorial view and an oblique back pictorial view, respectively of a complete vehicle seat according to the invention.
Figure 5A:
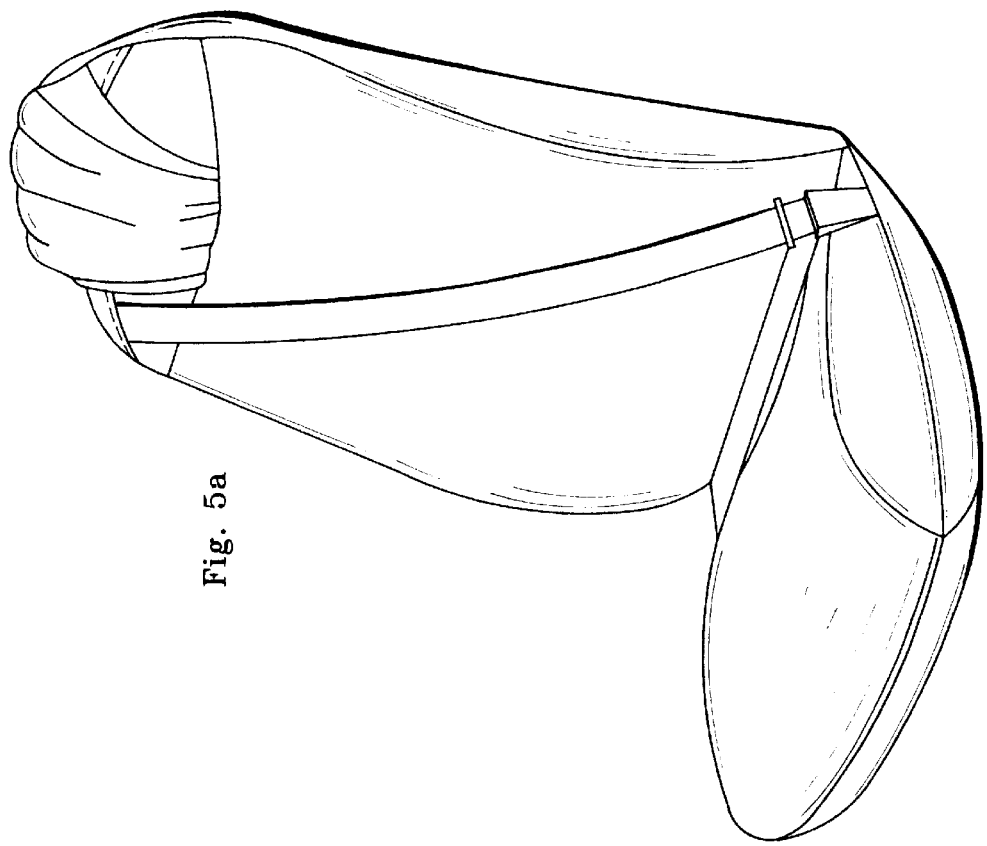

FIG. 3 shows how the space between the tube frame portions in connection to the bent portion C has been complemented with form plates 12 and 13. These form plates form pairs 12a, 13a and 12b, 13b, respectively, and the pairs are connected close to the tube frame portions 1 and 2. Preferably the pairs are clamped in a fit position. By having the form plates 12a, 12b at both sides (both outside and inside) they can be connected by welding, or in a simpler way by bolts and nuts and/or by screws. A rear cover 10 of, for example, reinforced glass fiber, with a covering rear 11 will make the back rest of the seat. A cushioned lower seat member (shown in FIGS. 5a and 5b) completes the seat.

Figure 4B:
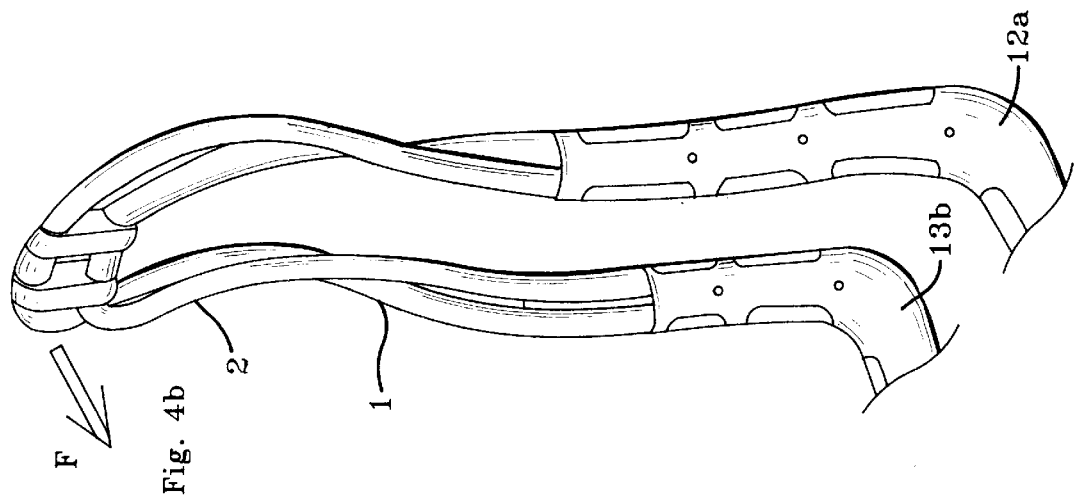
FIGS. 4a and 4b show diagrammatically how the seat body, comprising a parallel tube frame arrangement, will act during influence from a load.
Figure 4A:
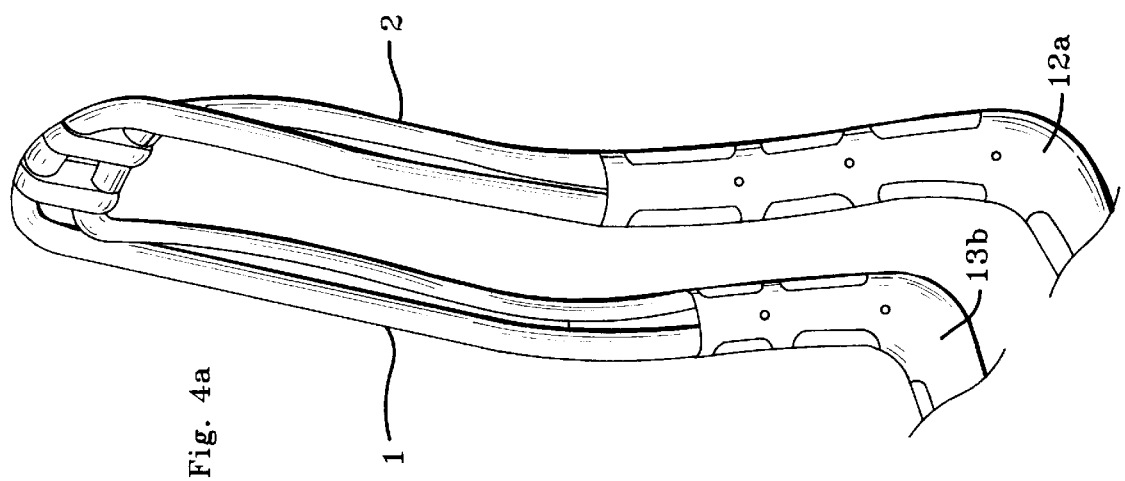

FIG. 4a shows the position of the upper resilient elastic portion of the parallel tube arrangement in a not-loaded position, while FIG. 4b shows the same portion of the arrangement during load from a force F (from the safety belt in a crash). Here it is clearly shown how the tube portions cooperate when being placed side by side and also being exposed to a torsion.

The invention is not restricted to the shown embodiments but modifications can be made within the scope of the following claims.

We claim:

1. A seat for a vehicle, comprising:
    a seat frame comprising two generally inverted-U-shaped tubes that are immediately adjacent to each other, said two tubes at a closed end of the inverted-U-shape defining an upper back portion of the seat, at a downwardly depending middle portion of the inverted-U-shape said two tubes defining a lower back portion of the seat, and at an open end of the inverted-U-shape said two tubes being bent relative to the middle portion so as to define a seat portion of the seat,
    in said lower back portion, axes of said tubes being generally parallel to each other in a plane perpendicular to a plane of said lower back portion,
    in said upper back portion, axes of said tubes being generally parallel to each other in a plane parallel to the plane of said lower back portion; and
    at least two reinforcing, deformable plates, each of said plates holding said two tubes parallel to each other in said lower back portion.

2. The seat of claim 1, further comprising at least one fastener joining said two tubes to each other in said upper back portion.

3. The seat of claim 1, wherein said two tubes have oval cross-sections.

4. The seat of claim 1, comprising two pairs of said plates, each of said pairs of plates holding said tubes.

5. The seat of claim 1, further comprising a seat belt fixedly attached to the seat at two places and removably attached to the seat at one place.

6. A seat for a vehicle, comprising:
    a first continuous tube bent in an inverted-U-shape with a closed end that forms an upper back portion of the seat and with sides downwardly depending from the closed end that form a lower back portion of the seat, each end of said tube at an open end of the inverted-U-shape being further bent forward to form a seat portion of the seat;
    a second continuous tube that is also bent into an inverted-U-shape and bent forward at each end to form the seat portion and that is immediately adjacent said first tube substantially throughout their lengths, said second tube being parallel to said first tube and directly behind said first tube at the lower back portion of the seat, said second tube being further bent forward above the lower back portion so that said second tube is directly beneath said first tube and parallel to said first tube at the upper back portion of the seat; and
    reinforcing, deformable plates holding said second tube directly behind and parallel to said first tube in the lower back portion,
    whereby the upper back portion of the seat is elastically movable relative to the lower back portion by virtue of said second tube being directly beneath and parallel to said first tube at the upper back portion and the lower back portion of the seat resists elastic deformation by virtue of said second tube being directly behind and parallel to said first tube in the lower back portion.

7. The seat of claim 6, further comprising plural fasteners joining said first and second tubes at the upper back portion.

8. The seat of claim 6, further comprising a stabilizing plate fixedly connecting one portion of said first and second tubes to another portion of said first and second tubes across the seat portion of the seat.

9. The seat of claim 8, further comprising a cross bar fixedly connecting one end of said first tube to another end of said first tube across the seat portion of the seat.

10. A method of restraining an occupant in a seat in a decelerating vehicle, the method comprising the steps, during vehicle deceleration, of:

restraining an occupant facing forward in a seat in a decelerating vehicle with a seat belt attached to the seat at an upper back portion of the seat and to a seat portion of the seat, the seat having two generally inverted-U-shaped tubes that are immediately adjacent to each other, the two tubes at a closed end of the inverted-U-shape defining the upper back portion of the seat, at a downwardly depending middle portion of the inverted-U-shape the two tubes defining the lower back portion of the seat, wherein the two tubes are parallel to each other with one of the tubes being directly behind the other of the tubes at the lower back portion of the seat, and wherein the two tubes are parallel to each other with the one of the tubes being directly beneath the other tube at the upper back portion of the seat;

elastically deforming the two tubes in the upper back portion of the seat under the strain of the attached seat belt on the upper back portion;

resisting permanent deformation of the two tubes in the lower back portion of the seat by holding the two tubes parallel to each other with the one of the tubes directly behind the other of the tubes with a reinforcing, deformable plate attached to the two tubes in the lower back portion of the seat.

\* \* \* \* \*